United States Patent Office 3,507,725
Patented Apr. 21, 1970

3,507,725
PROCESS FOR REPAIRING GAS MAIN JOINTS
Peter J. Hylak, 3112 W. 40th St., Chicago, Ill. 60632, and Gerald G. Wilson, 2307 S. Buckingham, Westchester, Ill. 60153
No Drawing. Filed Nov. 30, 1964, Ser. No. 414,870
Int. Cl. B32b 35/00
U.S. Cl. 156—94
16 Claims

ABSTRACT OF THE DISCLOSURE

A process for repairing gas main joints of the type sealed by fibrous packings. A liquid sealing substance which is curable to a substantially non-volatile and substantially solid condition is provided. The liquid substance is applied to the packings in the gas main until the packing becomes saturated with the substance. The liquid substance is then cured in the packing so that the cured liquid substance and the fibrous packings cooperate to provide a tough, non-volatile, and substantially permanent seal for the packed joints.

---

This invention relates to an improved process for repairing seals at gas main joints wherein the repairs are accomplished while the gas mains remain in service.

In the United States, there are thousands of miles of cast iron pipe utilizing packed bell-and-spigot joints for the distribution of gas. Although this pipe is generally in good condition and is expected to have a long useful life, there is a relatively high incidence of gas leakage from the pipe joints. These joints are commonly repaired or resealed by excavating around each individual joint and then applying a mechanical clamp around the exterior of each joint; this method of repairing leaking joints is, however, undesirably expensive. Another disadvantage of this external sealing method is that the joints are generally quite close together, usually twelve feet apart, and joint leakage generally occurs on an area basis so that when there is a defective main, many excavations are required and a public nuisance results.

The foregoing disadvantages of the external method for repairing leaking gas main joints have led to methods for internally sealing the leaking joints. However, all but one of the known internal sealing methods require that the gas main be taken out of service while the repairs take place. In addition to inconvenience to the customer, it is very expensive to shut down and later restore service to all customers connected into the section of the main that is being repaired. Therefore, it is very desirable to provide an internal sealing method which would permit the main to remain in service during the sealing operation.

Even the one known internal sealing method which permits the gas main to remain in service during repairs has significant disadvantages, to be hereinafter described. In this known method, a sealing liquid is poured or slowly pumped into a leaking gas main. Liquid is introduced to the main at a high point in the main so that the sealing liquid is carried to the leaking joints by flowing to the lower areas of the inclined main. The liquid climbs and fills the pores of the fibrous packing, commonly jute, by capillary action; the excess liquid sealant flows into drip pots provided at low points in the main where it may be recovered. At the present time, this internal method for inservice sealing of gas main joints is limited to sealing operations with about eight inch or smaller pipes since the liquid used, which is primarily a mixture of diethylene glycol and cresol or phenol, is not of such a nature that it will climb higher in a packing. However, for mains which are twelve inches or larger in diameter, the sealing liquid may be sprayed on to the packing. In this procedure, a hose is inserted in the main and is then withdrawn; it is stopped at each joint and the liquid sealant is applied.

In both the foregoing procedures, whether the sealant is introduced to the packing by spraying or by capillary action, since the seal is formed by a low-viscosity liquid, the seal thus formed is able to withstand only very low gas pressures, ordinarily about two p.s.i.g. or less. Furthermore, the sealant evaporates from the packing and also becomes leached out of the packing by ground water. As a result of this loss of sealant, the joints must be periodically retreated or resealed in order to maintain the seal.

It is therefore an important object of this invention to provide an improved process for repairing or sealing leaking joints of a gas main, wherein the disadvantages of prior art procedures are substantially avoided.

It is also an object of this invention to provide an improved process for repairing leaking joints of a gas main wherein the seals are repaired internally while the gas main remains in service.

It is another object of this invention to provide an improved internal sealing process for the joints of a gas main, wherein a substantially permanent seal, effective against relatively high pressures, is provided for each of the leaking joints of the main.

It is yet another object of this invention to provide an improved process for repairing leaking joints of a gas main wherein the seals for the joints exhibit little or no shrinkage with time and are chemically inert as to the gases flowing through the main.

It is a further object of this invention to provide an improved process for repairing leaking joints of a gas main, wherein the process is characterized by its simplicity and economy of operation.

Further purposes and objects of this invention will appear as the specification proceeds.

The first step of our improved process for internally sealing the leaking joints of a gas main is the introduction of a sealing material to a gas main and thereby to the leaking joints of the main. The sealing material is introduced to the joints in a variety of ways, including pumping the liquid therein, by pouring the liquid into the main, or by spraying the liquid directly onto the joints. In all manners of sealant application, the liquid sealant is added to the main through a service T or similar connection. In the pouring technique, due to the pitch of the main, the liquid sealant flows from a selected high point service connection to a low point where the excess sealing material is collected. The spraying technique is effective in the case of larger diameter mains, as over twelve inches. The fibrous packing, in the case of pouring, becomes saturated by the liquid sealant climbing it by capillary action, and in the case of spraying, becomes saturated upon contact with the sprayed sealant. The pouring of the substance into the main and taking advantage of capillary action in saturating the fibrous packing is the preferred procedure because it is highly economical.

Gas main joints are packed, for the most part, with fibrous materials which are readily permeated by liquid sealants. Jute constitutes a major portion of the existing fibrous gas main packings. Standard quality commercial jute packing is commonly made of reprocessed jute from cotton bales. Generally speaking, only jute and cotton fibers are used as packings for gas main joints. It is the fibrous nature of such packings which enables the liquid sealing substance to climb the jute or fibrous packing by capillary action and to thereby permeate or saturate the packing in order to effect the desired seal.

The liquid sealing substance which is utilized in our process is to be capable of being cured to a tough, non-volatile and impermeable solid which permeates the jute packing for effecting a substantially permanent seal. A sealing material which properly wets the jute and climbs the packing by capillary action is to be a free flowing liquid of less than about 500 cp. viscosity, is to have a surface tension of at least about 20 dynes/cm., and is to be able to wet the packings. Generally, the lower the viscosity and the higher the surface tension, the better will the process be. It is of futher importance that the sealing material is to be nonreactive with the gas flowing in the main and is to be compatible with the contaminants present in the jute; such contaminants include aromatic and aliphatic hydrcarbons, oxidized gums, rust and dirt.

The wetting ability of useful liquid sealing materials is measured by the time required for a 5.0 gm. sample of jute, compacted into a specially designed container, to sink in the sealing liquid. For a suitable sealant, time is not to exceed five minutes. The container used is a perforated section of Teflon tubing having end caps. The container has an outside diameter of 1⅛ inches, an inside diameter of 1 inch, a height of 3 inches, and includes seventy-two equally spaced ¼ inch diameter holes. The container is filled with a weighted amount of packing (7 g. when new jute is used) and is placed on its side on the surface of the sealant. The time required for the jute filled container to sink below the surface of the sealant is taken as the measure of the wetting ability of the liquid sealing substance.

After the introduction of the liquid sealant to the packing, whether by capillary action or by spraying, and the packing has become sufficiently saturated, it is an important aspect of our invention that the liquid sealant is cured for purposes of solidifying the liquid sealant. The curing of the sealant is accomplished in a variety of ways so as to provide the desired tough-non-volatile and substantially impermeable packing which provides the desired permanent seal. The seal resulting from our process, after curing, withstands gas pressure up to 25 p.s.i.g. and does not exhibit any tendency to evaporate or shrink over long periods of time. The various techniques which may be utilized for the curing of the liquid sealant include curing by temperature, by the addition of a material which is reactive with the liquid sealant, or by lapse of time.

In one form of the invention, our liquid sealing substance includes two reactive components which are mixed together and added to the main at temperatures below that at which the two components will react. Desirably, this is done during the colder months of the year, as during the winter, when the temperature is about 50° F. or below in the main. During the warmer months of the spring and summer when the temperature in the main rises above the reaction temperature of the components of the sealant, these components react to form a fiber-reinforced gasket for sealing the joint packings.

In the above described form of our invention, one part by weight of a modified aliphatic amine and one part by weight of a liquid epoxy resin have been found to be particularly satisfactory as the reactive components of the liquid sealant. The epoxy resin is primarily the diglycidyl ether of bisphenol-A, has a molecular weight per epoxide group of about 180–200, and has a viscosity of about 10,000 to 16,000 centipoises; the resin is modified with 30 percent butyl diglycidyl ether for lowering the viscosity to 300 cp. The modified aliphatic amine has a viscosity of about 200 centipoises; a suitable aliphatic amine is sold under the trademark Epi-Cure 855. After reaction, these substances form a tough, flexible, fiber-reinforced solid gasket that is able to withstand internal gas main pressures of about 25 p.s.i.g. The above amine-resin mixture is desirably placed in the main during the winter months when the temperature in the main is at about 40–50° F. The liquid sealant is thus allowed sufficient time to saturate the packing by capillary action; it is not until the temperature in the main rises above 50° F. that reaction occurs for providing the desired packing seal.

An epoxy-amine system which is also useful in our process includes an epoxy resin containing 30 percent by weight of pyridine, an aromatic amine. A suitable epoxy resin in this system is an epoxidized glycol, with a viscosity of 50 centipoises and a molecular weight of 200; this resin is available under the trademark DER-736. The epoxy resin is particularly useful in our process since it is a low molecular weight, low viscosity resin which does not require modification with butyl diglycidyl ether for lowering the viscosity. This system is about two parts by weight of a liquid epoxy resin and one part by weight of an aromatic amine.

In another form of our invention, wherein the curing of the sealant is accomplished by adding a second substance at a later time, the second substance either reacts with the liquid sealant or acts as a catalyst in curing the liquid sealant. The first liquid sealant is applied to the joints as previously described and sufficient time is permitted to elapse for the joint packings to become substantially saturated with the liquid sealant. At this time, the curing substance is applied to the joints of the main. Although the curing substance may be added to the joints by various techniques, including by spraying, it is highly desirable to introduce the curing substance into the main along with the gas stream as a vapor.

In a further form of our invention, particularly suitable sealing substances include silicone resin and polyurethane resins which are reactive with moisture. In order to cure either the silicone resin or the polyurethane resin which saturates the joints, about 0.01–0.02 pound of water per pound of dry gas are added to the gas stream entering the main. Another liquid which is advantageously used as the liquid sealing substance is tung oil or linseed oil. The tung oil used desirably has a saponification number of about 189–195, contains about 1% by weight of cobalt naphthenate to aid in the curing, and has an iodine number of about 160–180. The tung oil is cured by adding about five percent by volume of oxygen to the gas passing through the treated section of the main; the oxygen reacts with the unsaturated bonds in the oil to yield a gummy product which provides the desired seal.

In another form of our invention, wherein the liquid substance is cured by time, a liquid monomer is added to the main so as to saturate the leaking joint packings and is then polymerized by the lapse of a relatively long period of time. In this form of the invention it is important to select a monomer which requires a long period of time to polymerize so that saturation of the joints is substantially complete before polymerization proceeds to any substantial degree.

Liquid styrene monomer has been found to be particularly useful as the liquid sealant in the third form of our invention. The liquid monomer wets and climbs through approximately 18 inches of jute packing, yet requires a relatively long period of time, from about six weeks to about three months, in order to polymerize the monomer to a solid.

In one example illustrating the practice of one form of our invention, in order to seal a six to eight inch cast iron gas main having packed bell and spigot joints, a suitable high point for adding the liquid sealant was selected and a suitable low point or drip pot was also selected to collect the excess liquid. The liquid sealant was a silicone resin which was added to the main at the selected high point in an amount of approximately ¼ gallon of liquid sealing material per joint to be treated. The resin was added slowly and continuously over a period of several weeks and the overflow material was collected at the drip pot. (Alternatively, the resin may be added in a series of three to six pourings. The first pourings may be spaced a few days apart while the succeeding ones may be spaced about a week apart.)

After the addition of the liquid sealant, a period of about one month was allowed for the liquid resin to saturate the jute packing thoroughly by capillary action. At the end of this one month period, water vapor was added to the gas flowing in the treated section of the main in an amount varying from about 0.01 to about 0.02 pound of water per pound of dry gas flowing in the main. The water vapor reacted with the silicone resin to form a tough, solid cured material which was effective for sealing the joints with a permanent gastight seal. The water vapor addition was continued for a period of about two weeks for allowing sufficient time to complete the reaction.

From the foregoing it is seen that in all described forms of our novel sealing process, the packed joints are internally sealed while the mains remain in service, thereby avoiding inconvenient and expensive main shutdowns. The seals formed are permanent, solid gaskets which withstand high main pressures—up to about 25 p.s.i.g.; this is in contrast to all previous in-service internal sealing methods, wherein the seal is not permanent and withstands only very low gas pressures.

What we claim and desire to secure by Letters Patent is:

1. A process for repairing gas main joints, of the type sealed by fibrous packings, while the gas main is in use, which comprises:
 (a) providing a curable nonaqueous liquid sealing material which is non-reactive with the gas in the main, which is capable of wetting the packing upon contact at ambient conditions, and which is selected from the group consisting of
  (1) a liquid silicon resin,
  (2) a modified aliphatic amine and a liquid epoxy resin,
  (3) a liquid polyurethane resin,
  (4) tung oil,
  (5) linseed oil, and
  (6) a liquid styrene monomer:
 (b) contacting said liquid sealing material inside said gas main at ambient conditions with said packings at a joint in said gas main to saturate the same while the gas main is in its normal use; and
 (c) curing said liquid sealing material in said packings to form a tough impermeable integral fiber-reinforced solid gasket for said joint to thereby permanently seal the same.

2. The process of claim 1 wherein said liquid sealing material has a viscosity of less than about 500 cps., has a surface tension of at least about 20 dynes/cm., and in compatible with contaminants present in the packing material of each of said joints.

3 The process of claim 1 wherein said curing step is accomplished by increasing the temperature in said gas main and said joints.

4. The process of claim 1 wherein said gas main is inclined, said liquid sealing material comprises two reactive components which are non-reactive at temperatures below 50° F., said liquid sealing material is applied to said joints by pouring said liquid sealing material into a high point in said main while said main is at a temperature below about 50° F., and causing said liquid sealing material to move downwardly in the inclined main to the joints at lower points therein, using capillary action to cause said liquid sealing material to climb said packing so as to substantially saturate said packings, and then curing said liquid sealing material in said packings by increased temperature as the temperature in the main rises to above about 50° F. so that said components react to provide the desired seal.

5. The process of claim 4 wherein said reactive components are one part by weight of a modified aliphatic amine and one part by weight of a liquid epoxy resin.

6. The process of claim 4 wherein said reactive components are one part by weight of an aromatic amine and about two parts by weight of a liquid epoxy resin.

7. The process of claim 1 wherein said curing step is accomplished by adding a curing substance into said main in order to react with said liquid sealing material for the curing thereof in order to provide the desired seal for said joints.

8. The process of claim 7 wherein said liquid sealing material is a material selected from the group consisting of silicone resins and polyurethane resins, and said curing substance is water.

9. The process of claim 8 wherein said curing substance is added to the gas stream passing through the treated section of said main in an amount of about 0.01–0.02 pound of water per pound of dry gas.

10. The process of claim 7 wherein said liquid sealing material is a material selected from the group consisting of tung oil and linseed oil.

11. The process of claim 7 wherein said liquid sealing material is tung oil having a saponification number of about 189–195, having an iodine number of about 160-180, and containing about 1% by weight of cobalt naphthenate to aid in curing, and said curing substance is oxygen added to the gas entering the treated section of the main in an amount of about 5% by volume of said gas.

12. The process of claim 1 wherein said gas main joint is inclined, said liquid sealing material is a liquid silicone resin, said resin is applied to said joints first by pouring said resin into a high point in said main, then causing said liquid sealing material to move downwardly to the joints in the lower points in said main, and then using capaillary action to cause said liquid sealing material to climb said packings for saturating said packings in a period of about one month, said resin being added to the gas main in an amount of about ¼ of a gallon of liquid sealing material per joint to be sealed, and said curing of said silicone resin is accomplished by adding water vapor to the gas flowing in the said treated section of said gas main in the amount of 0.01–0.02 pound per pound of dry gas, said water vapor reacting with said silicone resin in order to form the desired permanent seal for said joints.

13. The process of claim 12 wherein the addition of water vapor is continued for a period of about two weeks in order to allow sufficient time to completely cure said resin.

14. The process of claim 1 wherein said liquid sealing material is curable by lapse of time and said curing is accomplished by lapse of time in order to provide the desired seal for said joints.

15. The process of claim 14 wherein said liquid sealing material is a liquid monomer that polymerizes slowly with time.

16. The process of claim 14 wherein said liquid monomer is liquid styrene monomer.

References Cited

UNITED STATES PATENTS 3,265,782    8/1966    Rosengarten et al. __ 264—36 XR
3,272,894    9/1966    Roach _____ 264—36

JOHN T. GOOLKASIAN, Primary Examiner

G. W. MOXON II, Assistant Examiner

U.S. Cl. X.R.

138—97; 156—296, 305, 326, 327, 329, 330; 264—36

PO-1050
(5/69)

UNITED STATES PATENT OFFICE
CERTIFICATE OF CORRECTION

Patent No. 3,507,725           Dated April 21, 1970

Inventor(s) Peter J. Hylak and Gerald G. Wilson

It is certified that error appears in the above-identified patent and that said Letters Patent are hereby corrected as shown below:

In column 1, line 5, follwoing the inventors' names and addresses after - 60153 - insert the following:

--assignors, by mesne assignments, to American Gas Association, a membership Corporation of the State of New York.--

SIGNED AND SEALED

OCT 27 1970

(SEAL)
Attest:

Edward M. Fletcher, Jr.
Attesting Officer

WILLIAM E. SCHUYLER, JR.
Commissioner of Patents